(12) United States Patent
Yen et al.

(10) Patent No.: US 11,150,532 B2
(45) Date of Patent: Oct. 19, 2021

(54) DISPLAY APPARATUS

(71) Applicant: E Ink Holdings Inc., Hsinchu (TW)

(72) Inventors: Chih-Ching Yen, Hsinchu (TW);
Chin-Ju Hsu, Hsinchu (TW); Yu-Nan Pao, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 26 days.

(21) Appl. No.: 15/785,417

(22) Filed: Oct. 16, 2017

(65) Prior Publication Data

US 2018/0173075 A1 Jun. 21, 2018

(30) Foreign Application Priority Data

Dec. 20, 2016 (CN) .......................... 201611182202.8

(51) Int. Cl.
*G02F 1/167* (2019.01)
*G02F 1/1333* (2006.01)
*G02F 1/16757* (2019.01)

(52) U.S. Cl.
CPC .......... *G02F 1/167* (2013.01); *G02F 1/16757* (2019.01); *G02F 1/133331* (2021.01); *G02F 2201/50* (2013.01)

(58) Field of Classification Search
CPC .... G03F 7/70383; G03F 7/704; G03F 7/0392; G03F 7/70358; G03F 7/0002; G03F 7/0007; G03F 7/0047; G03F 7/033; G03F 1/22; G03F 1/72; G03F 7/12; G03F 7/2028; G03F 7/70233; G03F 7/70433; G03F 7/70466; G03F 7/705; G03F 7/706; G03F 7/70616; G03F 7/70783; G02F 2001/136295; G02F 1/1333; G02F 1/1339; G02F 1/13394; G02F 1/133512; G02F 2001/13396; G02F 2001/13398; G02F 1/13338; G02F 1/13452; G02F 1/1362; G02F 1/1343
USPC ........ 359/237, 242, 265–267, 290–292, 295, 359/296, 298
See application file for complete search history.

(56) References Cited

U.S. PATENT DOCUMENTS

| | | | |
|---|---|---|---|
| 7,658,329 B2 | 2/2010 | Gelbman |
| 7,673,800 B2 | 3/2010 | Gelbman |
| 7,715,087 B2 | 5/2010 | Hou et al. |
| 9,235,075 B2 | 1/2016 | Montbach et al. |
| 2006/0158498 A1 | 7/2006 | Kim et al. |

(Continued)

FOREIGN PATENT DOCUMENTS

| | | |
|---|---|---|
| CN | 101144931 A | 3/2008 |
| CN | 102385211 A | 3/2012 |

(Continued)

OTHER PUBLICATIONS

Corresponding Taiwanese office action dated Jun. 7, 2017.
Corresponding Chinese office action dated Jul. 21, 2020.

*Primary Examiner* — Brandi N Thomas
(74) *Attorney, Agent, or Firm* — CKC & Partners Co., LLC

(57) ABSTRACT

A display apparatus includes a display module, a protective layer and at least one discontinuous printed pattern. The display module has a display area. The protective layer covers the display module. The discontinuous printed pattern is on the protective layer. The display area is partially covered by the discontinuous printed pattern.

16 Claims, 5 Drawing Sheets

(56) References Cited

U.S. PATENT DOCUMENTS

| | | | | |
|---|---|---|---|---|
| 2011/0007005 | A1* | 1/2011 | Lee | G06F 3/047 |
| | | | | 345/173 |
| 2012/0127547 | A1 | 5/2012 | Gocho et al. | |
| 2012/0256851 | A1 | 10/2012 | Wang et al. | |
| 2012/0317849 | A1* | 12/2012 | Chen | B32B 27/20 |
| | | | | 40/124.01 |
| 2013/0049032 | A1* | 2/2013 | Matsumi | H01L 27/3211 |
| | | | | 257/88 |
| 2014/0043248 | A1* | 2/2014 | Yeh | H01Q 7/00 |
| | | | | 345/173 |
| 2015/0109228 | A1* | 4/2015 | Chen | G02B 1/11 |
| | | | | 345/173 |
| 2016/0221293 | A1* | 8/2016 | Park | B32B 3/02 |
| 2016/0307545 | A1* | 10/2016 | Lee | G09G 5/38 |

FOREIGN PATENT DOCUMENTS

| | | |
|---|---|---|
| CN | 102411403 A | 4/2012 |
| CN | 102645809 A | 8/2012 |
| CN | 102981661 A | 3/2013 |
| CN | 103309156 A | 9/2013 |
| KR | 10-2014-0036792 A | 3/2014 |
| TW | 201614338 A | 4/2016 |
| WO | 2015155646 A1 | 10/2015 |

* cited by examiner

|  |  | L* | a* | b* |
|---|---|---|---|---|
| discontinuous print pattern | white image | 50.07 | -21.71 | 26.5 |
|  | black image | 14.62 | -7.2 | 5.21 |
| continuous print pattern | white image | 49.55 | -16.67 | 20.99 |
|  | black image | 17.08 | -8.73 | 3.71 |

Fig. 3

DISPLAY APPARATUS

RELATED APPLICATIONS

This application claims priority to Chinese Application Serial Number 201611182202.8, filed Dec. 20, 2016, which is herein incorporated by reference.

BACKGROUND

Technical Field

The present disclosure relates to a display apparatus.

Description of Related Art

Due to power saving advantage of electronic paper display, the electronic paper display becomes one of attentions in display field. The electronic paper display is a reflective display, and hence when it includes color filter, incident and reflection lights may pass through color filter regions with different colors. Therefore, manufacture of colored electronic paper display still faces some difficulties to be overcome. As a result, currently popular electrical paper display is still the reflective display apparatus showing gray scale images.

SUMMARY

Display apparatus according to embodiments of the present disclosure may either display particular pattern on a protective layer when the display apparatus shows bright images, or may conceal the pattern on the protective layer when the display apparatus shows dark images. As a result, when the display apparatus is a gray scale display, this design may be advantageous such that the whole displayed image of the gray scale display to be more colorful. Moreover, when the gray scale display shows dark images, this design may be advantageous such that the whole display image can be in a uniform dark state.

In accordance with one embodiment of the present disclosure, a display apparatus includes a display module and a protective layer covering the display module. The display module has a display area. The protective layer has an inkjet printed pattern region over the display area. An area of a non-printed pattern region of the protective layer is greater than an area of the inkjet printed region. The protective layer covers the display module. The discontinuous printed pattern is on the protective layer. The display area is partially covered by the discontinuous printed pattern.

In accordance with one embodiment of the present disclosure, a display apparatus includes a display module, a protective layer and at least one printed pattern. The display module has a display area. The protective layer is over the display module. The printed pattern is on a region of the protective layer. Other region of the protective layer is free from printed features. The region free from printed features has an area greater than that of the region on which the printed pattern is present. The printed pattern is over the display area.

In the foregoing embodiments, since the discontinuous printed pattern, such as inkjet printed pattern, covers a portion of the display area, lights of image shown in the display area can help the user to perceive the discontinuous printed pattern. Further, compared to continuous printed pattern, when the display area shows dark images, such as black images, concealment of the discontinuous printed pattern can be improved, so as to prevent the discontinuous printed pattern from perception of the user. Therefore, the discontinuous printed pattern can be beneficial to make the display area in a uniform dark state.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 3 is a chart of CIE coordinates illustrating comparison of discontinuous and continuous printed patterns;

DETAILED DESCRIPTION

Figure 1:
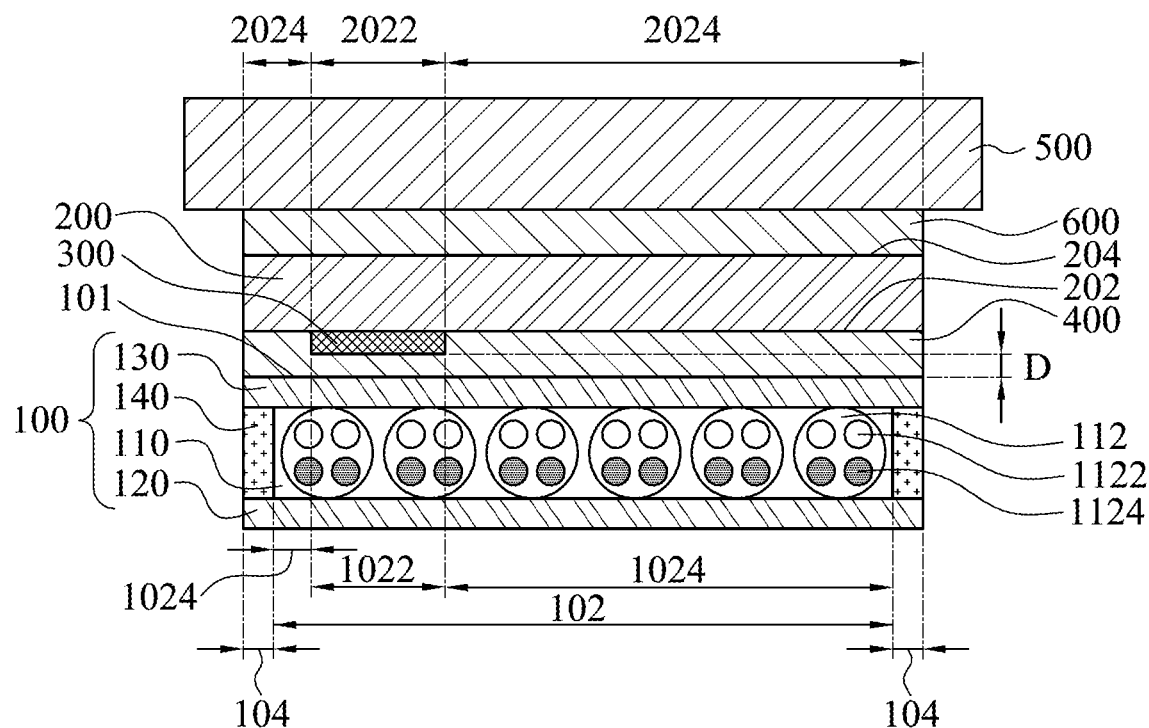
FIG. 1 is a cross-sectional view of a display apparatus in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a cross-sectional view of a display apparatus in accordance with one embodiment of the present disclosure. As shown in FIG. 1, in this embodiment, the display apparatus includes a display module 100, a protective layer 200 and a discontinuous printed pattern 300. The protective layer 200 covers the display module 100. The display module has a display area 102 and a non-display area 104. The display area 102 is adjoined to the non-display area 104. For example, in some embodiments, the display area 102 may be enclosed by the non-display area 104. The "display area" of the display module 100 means that luminosity of this area varies as the display module 100 is switched. The "non-display area" of the display module 100 means that luminosity of this area does not vary as the display module 100 is switched, or alternatively, variation of luminosity of this area is less than that of the display area 102 as the display module 100 is switched.

The discontinuous printed pattern 300 is present on the protective layer 200. The display area 102 is partially covered by the discontinuous printed pattern 300. For example, the discontinuous printed pattern 300 covers a partial region 1022 of the display area 102 and uncovers other remaining region 1024 of the display area 102. Therefore, when the display area 102 of the display module 100 shows an image, lights forming the image is advantageous such that the user can perceive the discontinuous printed pattern 300 over the display area 102. For example, when lights from the display area 102 arrive at the discontinuous printed pattern 300, lights within particular wavelength range can be absorbed by the discontinuous printed pattern 300, while lights within other wavelength range can pass through the discontinuous printed pattern 300. That is to say, the discontinuous printed pattern 300 can have color filter function. Therefore, when the discontinuous printed pattern 300 receives white light from the display area 102, the user can see the discontinuous printed pattern 300 with particular color. For example, lights within green wavelength range can pass through the discontinuous printed pattern 300, and hence the user can see green discontinuous printed pattern 300. As a result, the protective layer 200 can show pattern with particular color by determining discontinuous printed pattern 300 with particular filter wavelength range.

In some embodiments where the display module 100 is a gray scale display, the designs discussed previously may be advantageous such that the whole displayed image may display either a gray scale image or a pattern with other color, so that the whole displayed image may be more colorful. These designs can also be applied in embodiments where the display module 100 is a colored display. For example, the display module 100 can include color filter therein, or alternatively, display medium layer 110 of the display module 100 may include charged particles with colors, so that the display module 100 can be referred to as a colored display module.

In this context, "discontinuous printed pattern" refers to that materials of the printed pattern are distributed on a substrate to be printed in a spaced apart manner. Spaced apart distribution of the materials can be implemented by particular print methods or by introducing additional light permeable spacers into the printing materials. For example, the discontinuous print method may be inkjet print. Because the inkjet printing can intermittently drop ink drops, and hence it can print discontinuous ink drops on the protective layer 200, so as to form discontinuous printed pattern 300 on the protective layer 200. As a result, when the discontinuous printed pattern 300 is formed using inkjet printing, it can be referred to as inkjet printed pattern as well. Compared to pattern formed by continuous printing, such as screening printing, the discontinuous printed pattern 300 has better concealment when the display area 102 of the display module 100 shows dark images, so as to prevent the discontinuous printed pattern 300 from perceived by the user, and hence improve uniformity of dark state of the display area 102.

Figure 2:
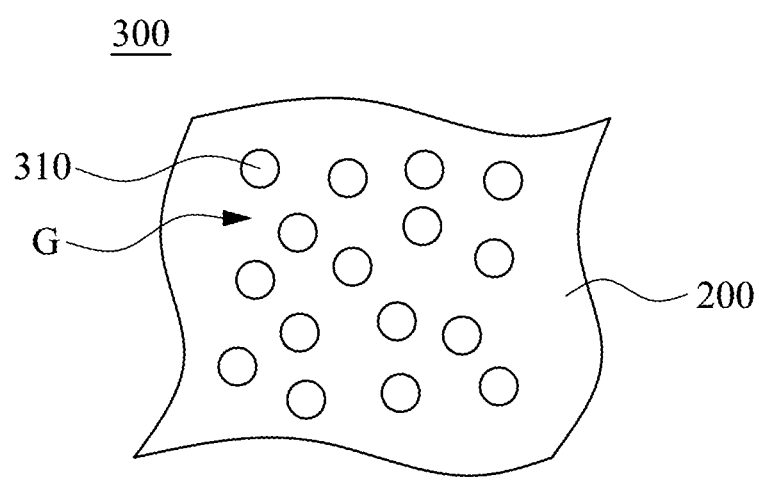
FIG. 2 is an enlarged view of the discontinuous printed pattern.

Reference is made to FIG. 2, which is an enlarged view of the discontinuous printed pattern 300. As shown in FIG. 2, based on features of the discontinuous printing, the formed discontinuous printed pattern 300 may include a plurality of micro-patterns 310. These micro-patterns 310 may be formed, for example, by cured inkjet drops discontinuously dropped during the inkjet printing. Since the ink drops are intermittently dropped during the inkjet printing, the ink drops will be distributed on the printed substrate (e.g., protective layer 200 as shown in FIG. 1) in a spaced apart manner. As such, cured micro-patterns 310 can be separated by the by gaps G. Therefore, when the display area 102 of the display module 100 (as shown in FIG. 1) shows dark images, the user can see a portion of the display area 102 in dark state below the gap G through the gap G. As a result, the micro-patterns 310 tend to be ignored in visual perception and are thus hard to be perceived by the user, so that the display area 102 can be in a uniform dark state in visual perception. On the contrary, continuous printed pattern does not include the separated micro-patterns 310, and hence the discontinuous printed pattern 300 has better concealment than that of the continuous printed pattern when the display module 100 shows dark images. In addition to inkjet printing, the foregoing discontinuous printed pattern 300 can be implemented by any other suitable method that can form the micro-patterns 310.

In some embodiments, the micro-patterns 310 formed by discontinuous printing are sized in micrometer scale. For example, the micro patterns 310 have a diameter ranging, for example, from 5 μm to 80 μm. When the display area 102 of the display module 100 shows dark images, the separated micrometer-scaled patterns 310 tend to be ignored in visual perception, so as to improve concealment of the discontinuous printed pattern 300 when the display module 100 shows dark images.

FIG. 3 is a chart of CIE coordinates illustrating comparison between discontinuous and continuous printed patterns. Experiments in this chart are performed using forming green pattern on the protective layer 200, and the experiments can be used to explicate the difference of CIE coordinates between the discontinuous and continuous printed patterns. It is understood that the discontinuous printing experiment in this chart is inkjet printing, and the continuous printing experiment in this chart is screen printing. As shown in FIG. 3, when the display module 100 shows black images, "L*" value of the green pattern formed using discontinuous printing is about 14.62, and "L*" value of the green pattern formed using continuous printing is about 17.08. Therefore, when the display module 100 shows black images, the green pattern formed using discontinuous printing can be darker than that formed using continuous printing, so that the green pattern formed using discontinuous printing is harder to be perceived by the user, which makes the display area 102 become more uniform dark state.

In some embodiments, as shown in FIG. 1, the protective layer 200 has bottom and top surfaces 202 and 204. The bottom and top surfaces 202 and 204 are opposite. For example, the bottom surface 202 is a surface of the protective layer 200 closest to or proximal to the display module 100, and the top surface 204 is a surface of the protective layer 200 farthest from or distal from the display module 100. The discontinuous printed pattern 300 can be present on a partial region 2022 of the bottom surface 202 of the protective layer 200, and does not cover other remaining region 2024 of the bottom surface 202. During manufacturing process, ink drops can be intermittently dropped on the partial region 2022 of bottom surface 202 of protective layer 200, for example, using inkjet printing. This printing process can directly form micro-patterns 310 on the partial region 2022 of bottom surface 202 as shown in FIG. 2, so as to form discontinuous printed pattern 300 on the partial region 2022 of bottom surface 202.

Because the discontinuous printed pattern 300 is formed on the bottom surface 202 of protective layer 200, the discontinuous printed pattern 300 can be farther away from the user when the user views the display apparatus from above it. Therefore, when the display module 100 shows dark images, this configuration may be advantageous such that the discontinuous printed pattern 300 tends to be ignored more easily, so as to further improve concealment of the discontinuous printed pattern 300 when the display module 100 shows dark images.

In some embodiments, as shown in FIG. 1, the display apparatus further includes an optical adhesive layer 400. The optical adhesive layer 400 is present between the display module 100 and the protective layer 200. The optical adhesive layer 400 adheres the display module 100 to the bottom surface 202 of protective layer 200. The discontinuous printed pattern 300 can be covered by the optical adhesive layer 400, so that the discontinuous printed pattern 300 and the display module 100 can be separated by the optical adhesive layer 400, such that the discontinuous printed pattern 300 and the display module 100 are separated by a distance D. In some embodiments, distance D is micrometer-scaled. For example, the distance D may range from 1 µm to 200 µm. By the micrometer-scaled distance D, the discontinuous printed pattern 300 can be closer to the display module 100 and farther away from the top surface 204 of protective layer 200. Therefore, when the user sees the display apparatus, the discontinuous printed pattern 300 can be farther away from the user, so as to improve concealment of the discontinuous printed pattern 300 when the display module 100 shows dark images.

In some embodiments, the discontinuous printed pattern 300 and the display module 100 do not separated by a distance. In other words, the discontinuous printed pattern 300 can be in contact with the display module 100. For example, ink drops can be intermittently dropped on a partial region of top surface 101 of the display module 100, for example, using inkjet printing. This printing process can form micro-patterns 310 on the partial region of top surface 101 of display module 100 as shown in FIG. 2, so as to form discontinuous printed pattern 300 on the partial region of the top surface 101. Because the discontinuous printed pattern 300 is formed on the top surface 101 of display module 100, the discontinuous printed pattern 300 can be farther away from the user when the user sees the display apparatus, so as to further improve concealment of the discontinuous printed pattern 300 when the display module 100 shows dark images.

Because the remaining region 1024 of the display area 102 is not covered by the discontinuous printed pattern 300, the displayed image on the remaining region 1024 will not be affected or blocked by the discontinuous printed pattern 300. Moreover, in some embodiments, the remaining region 2024 of bottom surface 202 of protective layer 200 is free from printed features or color filter features, such as inks or color filter materials. The remaining region 2024 has an area greater than that of the partial region 2022 on which the discontinuous printed pattern 300 is present, so as to prevent the discontinuous printed pattern 300 from unduly blocking the displayed image on the display area 102. In other words, the partial region 2022 on which the discontinuous printed pattern 300 is present will not affect the image displayed on the remaining region 1024 of the display area 102. For example, the discontinuous printed pattern 300 will not act as color filter for the remaining region 1024 of the display area 102. Stated in another way, an area of a non-printed pattern region 2024 is greater than an area of the inkjet printed region 2022.

In some embodiments, the display module 100 may include a display medium layer 110. The display medium layer 110 is capable of displaying images, and hence an area of the display module 100 occupied by the display medium layer 110 is referred to as the display area 102. The display medium layer 110 is partially covered by the discontinuous printed pattern 300. For example, a projection of the display medium layer 110 on the bottom surface 202 of protective layer 200 may overlap with the discontinuous printed pattern 300. That is to say, a projection area of the discontinuous printed pattern 300 on the bottom surface 202 is less than that of the display medium layer 110 on the bottom surface 202, and the projection of discontinuous printed pattern 300 on the bottom surface 202 is enclosed within that of the display medium layer 110 on the bottom surface 202. By such a configuration, the discontinuous printed pattern 300 may block a portion of the display medium layer 110, and a remaining portion of the display medium layer 110 is not blocked by the discontinuous printed pattern 300. As such, image displayed by the remaining portion of display medium layer 110 will not be affected or blocked by the discontinuous printed pattern 300.

In some embodiments, the display medium layer 110 may be a bi-stable display medium layer, such as an electrophoretic layer, a cholesteric liquid crystal layer or other suitable bi-stable display medium layer. Take the electrophoretic layer as an example, the display medium layer 110 may include a plurality of microcapsules 112. Each microcapsule 112 includes light-colored charged particles 1122 and deep-colored charged particles 1124 with different charges. These charged particles can be moved by electric field, so as to show gray scale images of the display medium layer 110.

In some embodiments where the display medium layer 110 is the electrophoretic layer, one or more microcapsules 112 can be covered by the discontinuous printed pattern 300, and other microcapsules 112 are not covered by the discontinuous printed pattern 300. When the microcapsules 112 covered by the discontinuous printed pattern 300 is in bright state (e.g., light-colored charged particles 1122 are above deep-colored charged particles 1124), reflected lights from the microcapsules 112 within particular wavelength range can pass through the discontinuous printed pattern 300, and hence the user can see the discontinuous printed pattern 300 with particular color. When the display module 100 shows dark images, all of the microcapsules 112 are in dark state (e.g., deep-colored charged particles 1124 are above light-colored charged particles 1122), and the user can see the dark microcapsules 112 under gaps G (as shown in FIG. 2) among the micro-patterns 310 through the gaps G. Therefore, these micro-patterns 310 tend to be ignored in visual perception, so that the display area 102 can show a uniform dark state in visual perception.

In some embodiments, the display module 100 further includes bottom and top substrates 120 and 130. The display medium layer 110 is interposed between the bottom and top substrates 120 and 130, so that the display medium layer 110 can be controlled by the electric field generated from the bottom and top substrates 120 and 130. For example, the bottom substrate 120 can be a thin film transistor (TFT) array substrate, and the top substrate 130 can include a common electrode layer. Pixel electrodes on the TFT array substrate and the common electrode layer on top substrate 130 can generate an electric field, and this electric field can control positions of light-colored charged particles 1122 and deep-colored charged particles 1124 in the microcapsules 112.

In some embodiments, the display module 100 further includes an edge adhesive 140. The edge adhesive 140 encloses the display medium layer 110, so as to seal the display medium layer 110 between the bottom and top substrates 120 and 130. Due to the fact that display medium is absent in the edge adhesive 140, the non-display area 104 of the display module 100 can be defined by the edge adhesive 140. Moreover, because the discontinuous printed pattern 300 is located within the display area 102 and outside the non-display area 104, the edge adhesive 140 will not be covered by the discontinuous printed pattern 300.

In some embodiments, as shown in FIG. 2, the micro-patterns 310 are homochromatic. In other words, any neighboring two homochromatic micro-patterns 310 are free from a printed pattern with a different color from the micro-patterns 310 interposed therebetween. For example, two green micro-patterns 310 are free from a non-green (e.g., red, blue or yellow) ink or other printed materials interposed therebetween. As such, the discontinuous printed pattern 300 formed by the micro-patterns 310 can render a homochromatic pattern.

Figure 4:
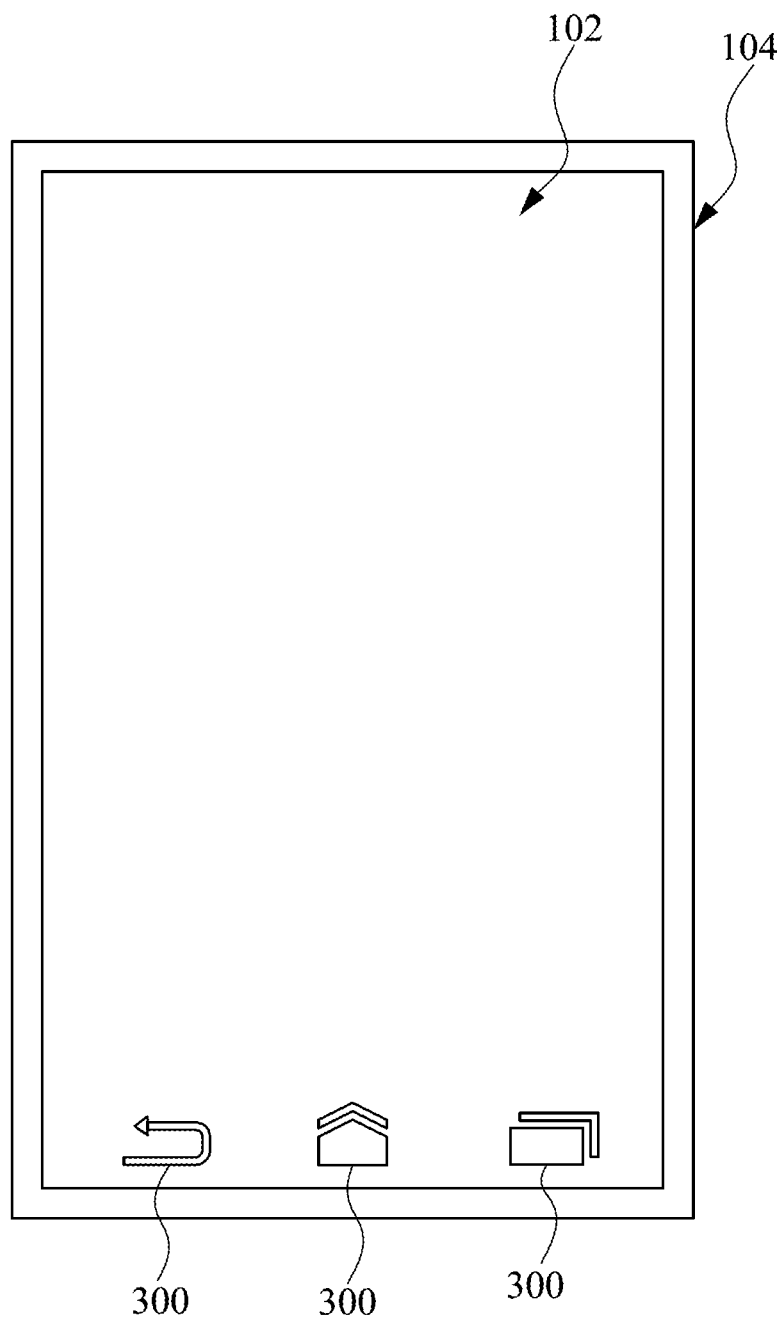
FIG. 4 is a top view of the display apparatus shown in FIG. 1.

FIG. 4 is a top view of the display apparatus shown in FIG. 1. As shown in FIG. 4, in some embodiments, an amount of the discontinuous printed pattern 300 is plural. The discontinuous printed patterns 300 are located within the display area 102, and hence they can show patterns with particular color when the display area 102 shows an image. Shapes, colors or combinations thereof of the discontinuous printed patterns 300 can be designed according to various requirements. For example, at least two of the discontinuous printed patterns 300 have different shapes; at least two of the discontinuous printed patterns 300 have different colors; or at least two of the discontinuous printed patterns 300 have different shapes and colors. Such designs may help the user to distinguish the different discontinuous printed patterns 300. Therefore, in some embodiments where the display apparatus includes a touch panel (not shown), the discontinuous printed patterns 300 that are distinguishable from each other can be provided with different touch functions. For example, when the user touches a partial region of the touch panel above left one of discontinuous printed patterns 300 in FIG. 4, the touch panel can provide a control signal to the processor (not shown), and this processor can trigger a web page previously browsed, and this web page can be displayed in the display area 102; when the user touches a partial region of the touch panel above middle one of discontinuous printed patterns 300 in FIG. 4, the touch panel can provide another control signal to the processor, and this processor can control the display area 102 to display a desktop screen.

In some embodiments, the protective layer 200 has an anti-ultraviolet feature, a waterproof feature or combinations thereof. For example, the protective layer 200 has a surface coated with anti-ultraviolet material or waterproof material. Material of the protective layer 200 can be, for example, polyethylene terephthalate (PET), polycarbonate (PC), poly (methyl methacrylate) (PMMA) or other suitable light permeable protective materials.

In some embodiments, as shown in FIG. 1, the display apparatus further includes a cover lens 500 covering the protective layer 200. For example, the display apparatus further includes an optical adhesive layer 600. The optical adhesive layer 600 is between the cover lens 500 and the protective layer 200. The optical adhesive layer 600 adheres the cover lens 500 to top surface 204 of the protective layer 200. As such, the cover lens 500 can protect underlying protective layer 200 and the display module 100. In some embodiments, a material of the cover lens 500 may be light permeable plastic, glass, or other suitable light permeable materials.

Figure 5:
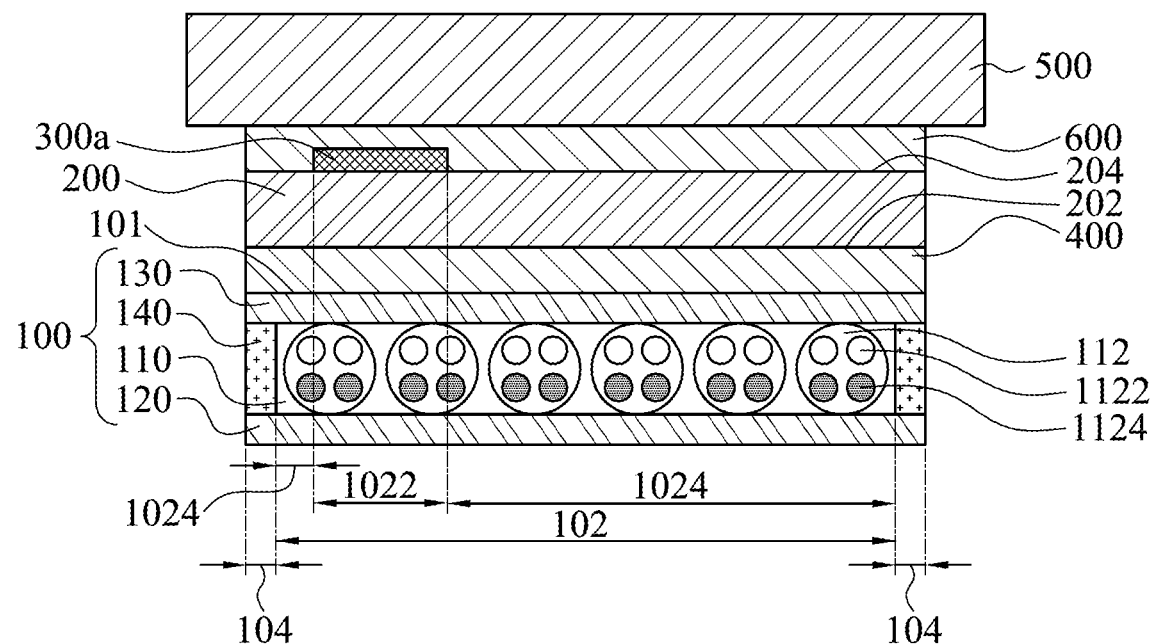
FIG. 5 is a cross-sectional view of a display apparatus in accordance with another embodiment of the present disclosure.

FIG. 5 is a cross-sectional view of a display apparatus in accordance with another embodiment of the present disclosure. As shown in FIG. 5, the embodiment differs from that is shown in FIG. 1 at least in that: discontinuous printed pattern 300a is present on the top surface 204 of protective layer 200 and covers the partial region 1022 of the display area 102. As such, when the display module 100 displays images, lights from the partial region 1022 of the display area 102 may help the overlying discontinuous printed pattern 300a to show particular color. Moreover, similar to the discontinuous printed pattern 300 as discussed previously, the discontinuous printed pattern 300a in the present embodiment has a plurality of separated micro-patterns as well. Therefore, when the display module 100 displays dark images, the discontinuous printed pattern 300a has better concealment than that of the continuous printed pattern. Details of the discontinuous printed pattern 300a are the same as that of the discontinuous printed pattern 300 discussed previously, and hence are not repeated herein. In the present embodiment, the cover 500 can cover the discontinuous printed pattern 300a. In a greater detail, the discontinuous printed pattern 300a can be present between the protective layer 200 and the cover lens 500, and the discontinuous printed pattern 300a can be covered by the optical adhesive layer 600 between the protective layer 200 and the cover lens 500.

Figure 6:
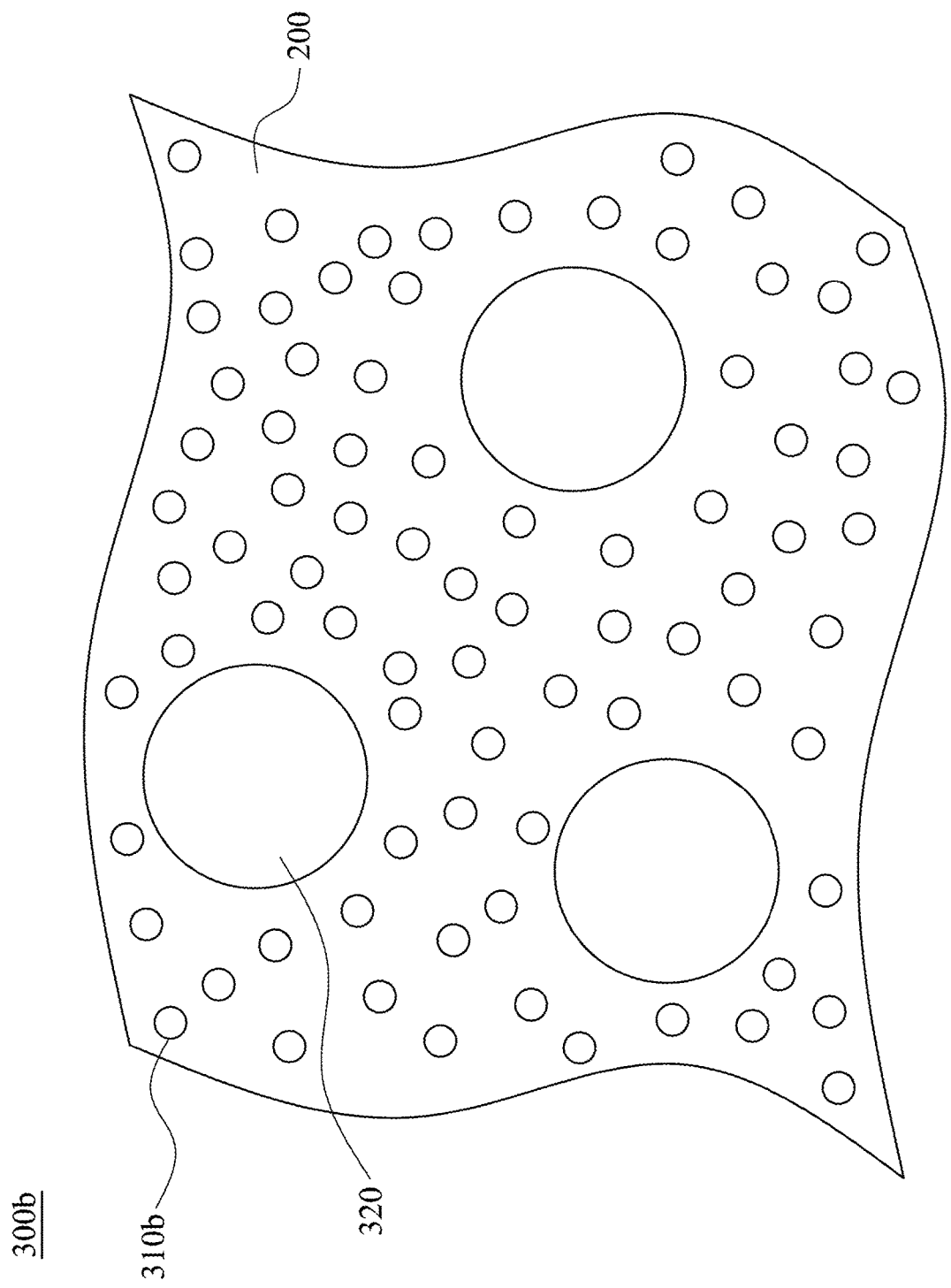
FIG. 6 is an enlarged view of a discontinuous printed pattern in accordance with another embodiment of the present disclosure.

FIG. 6 is an enlarged view of a discontinuous printed pattern 300b in accordance with another embodiment of the present disclosure. This embodiment differs from previous embodiments at least in that: the discontinuous printed pattern 300b of the present embodiment may include a plurality of light permeable spacers 320. These light permeable spacers 320 can space the micro-patterns 310b apart. As such, the light permeable spacers 320 can increase distances among the micro-patterns 310b, so that when the display area 102 (as shown in FIG. 1) displays dark images, the user can see dark display area 102 under the discontinuous printed pattern 300b more easily. In some embodiments, the light permeable spacers 320 have sizes greater than that of the micro-patterns 310b, so as to further increase distances among the micro-patterns 310b. As a result, concealment of the discontinuous printed pattern 300b when the display module shows dark images can be further improved.

In some embodiments, the light permeable spacers 320 can be balls with diameter greater than that of the micro-patterns 310b. For example, the light permeable balls may have a diameter in a range, for example, from about 1 μm to about 80 μm. In some embodiments, material of the light permeable spacers 320 may be glass, light permeable plastic, or other suitable light permeable materials. Exemplary formation of the discontinuous printed patterns 300b may include: introducing a plurality of solid light permeable spacers 320 into liquid ink, and coating the ink with the light permeable spacers 320 onto the protective layer 200. When the liquid ink is cured and forms numerous micro-patterns 310b, numerous light permeable spacers 320 can space the micro-patterns 310b apart.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A display apparatus, comprising:
a bi-stable display module having a display area and a non-display area, wherein the display area has a partial region adjacent to the non-display area;
a protective layer covering the bi-stable display module;
at least one discontinuous printed pattern on the protective layer, wherein the discontinuous printed pattern overlaps the display area of the bi-stable display module, the discontinuous printed pattern is separated from the bi-stable display module, an orthogonal projection of the discontinuous printed pattern on the bi-stable display module is spaced apart from the non-display area, and the entire discontinuous printed pattern is located in the partial region of the display area; and a cover lens, wherein the discontinuous printed pattern is between the cover lens and the bi-stable display module, and the discontinuous printed pattern is spaced apart from the cover lens.

2. The display apparatus of claim 1, wherein the protective layer has a surface closest to the bi-stable display module, and wherein the discontinuous printed pattern is on the surface of the protective layer.

3. The display apparatus of claim 2, wherein the discontinuous printed pattern is on a region of the surface of the protective layer, and wherein other region of the surface is free from color filter features.

4. The display apparatus of claim 1, wherein the discontinuous printed pattern and the bi-stable display module are separated by a distance ranging from 1 µm to 200 µm.

5. The display apparatus of claim 1, wherein the protective layer has a surface farthest from the bi-stable display module, and wherein the discontinuous printed pattern is on the surface of the protective layer.

6. The display apparatus of claim 5, wherein the discontinuous printed pattern is on a region of the surface of the protective layer, and wherein other region of the surface is free from color filter features.

7. The display apparatus of claim 1, wherein the discontinuous printed pattern is between the cover lens and the protective layer.

8. The display apparatus of claim 1, wherein discontinuous printed pattern comprises a plurality of micro-patterns with a diameter ranging from 5 µm to 80 µm, and wherein the micro-patterns are spaced apart from each other.

9. The display apparatus of claim 8, wherein the micro-patterns are homochromatic.

10. The display apparatus of claim 8, wherein any neighboring two of the homochromatic micro-patterns are free from a printed pattern with a different color from the micro-patterns interposed therebetween.

11. The display apparatus of claim 8, further comprising: a light permeable spacer spacing the micro-patterns apart.

12. The display apparatus of claim 11, wherein the light permeable spacer has a size greater than that of one of the micro-patterns.

13. The display apparatus of claim 1, wherein an amount of the at least one discontinuous printed pattern is plural, and wherein the discontinuous printed patterns have different shapes, colors or combinations thereof.

14. The display apparatus of claim 1, wherein the bi-stable display module comprises a display medium layer defining the display area, and wherein the discontinuous printed pattern covers a portion of the display medium layer.

15. A display apparatus, comprising:
a bi-stable display module having a display area and an non-display area, wherein the display area has a partial region adjacent to the non-display area;
a protective layer covering the bi-stable display module, wherein the protective layer has an inkjet printed pattern region overlapping the display area, the inkjet printed pattern is separated from the bi-stable display module, an area of a non-printed pattern region of the protective layer is greater than an area of the inkjet printed pattern region, an orthogonal projection of the inkjet printed pattern region on the bi-stable display module is spaced apart from the non-display area, and the entire inkjet printed pattern is located in the partial region of the display area; and
a cover lens, wherein the inkjet printed pattern is between the cover lens and the bi-stable display module, and the inkjet printed pattern is spaced apart from the cover lens.

16. The display apparatus of claim 15, wherein the protective layer has a surface proximal to the bi-stable display module, and wherein the inkjet printed pattern is on the surface of the protective layer.

\* \* \* \* \*